(12) United States Patent
Tokuoka et al.

(10) Patent No.: US 7,976,984 B2
(45) Date of Patent: Jul. 12, 2011

(54) POWDERED GRAPHITE AND NONAQUEOUS ELECTROLYTE SECONDARY BATTERY

(75) Inventors: Saori Tokuoka, Fukushima (JP); Atsuo Omaru, Fukushima (JP); Izaya Okae, Fukushima (JP)

(73) Assignee: Sony Corporation, Tokyo (JP)

( * ) Notice: Subject to any disclaimer, the term of this patent is extended or adjusted under 35 U.S.C. 154(b) by 1021 days.

(21) Appl. No.: 11/222,616

(22) Filed: Sep. 9, 2005

(65) Prior Publication Data

US 2006/0062717 A1    Mar. 23, 2006

(30) Foreign Application Priority Data

Sep. 17, 2004  (JP) ................................ P2004-270802

(51) Int. Cl.
 *H01M 4/96* (2006.01)
(52) U.S. Cl. ..................................... 429/231.8; 429/122
(58) Field of Classification Search ............... 429/231.4, 429/231.8, 231.95
See application file for complete search history.

(56) References Cited

U.S. PATENT DOCUMENTS

| | | | |
|---|---|---|---|
| 6,139,990 A * | 10/2000 | Kubota et al. | 429/231.8 |
| 6,573,007 B2 * | 6/2003 | Majima et al. | 429/231.4 |
| 6,623,888 B1 * | 9/2003 | Omaru et al. | 429/231.8 |
| 6,730,135 B2 * | 5/2004 | Choi et al. | 29/623.1 |
| 7,326,497 B2 * | 2/2008 | Matsubara et al. | 429/231.8 |
| 2004/0072076 A1 * | 4/2004 | Matsubara et al. | 429/231.8 |

FOREIGN PATENT DOCUMENTS

| | | |
|---|---|---|
| JP | 11-263612 | 9/1999 |
| JP | 2000-067871 | 3/2000 |
| JP | 2000-223120 | 8/2000 |
| JP | 2001-338640 | 12/2001 |
| JP | 2002216757 A * | 8/2002 |
| JP | 2003-068301 * | 3/2003 |
| JP | 2003-119014 | 4/2003 |
| JP | 2003-197182 | 7/2003 |
| JP | 2003-197185 | 7/2003 |
| JP | 2003-197189 | 7/2003 |
| JP | 2003-346804 | 12/2003 |

OTHER PUBLICATIONS

IPDL machine translation of JP 2003-068301.*
Machine translation of JP 2002-216757.*

* cited by examiner

*Primary Examiner* — Dah-Wei D Yuan
*Assistant Examiner* — Maria J Laios
(74) *Attorney, Agent, or Firm* — K&L Gates LLP (57) ABSTRACT

A powdered graphite and a nonaqueous electrolyte secondary battery are provided. A nonaqueous electrolyte secondary battery is provided which has a highly efficient charge and discharge performance and superior cycle properties. Spheroidizing treatment is appropriately performed for natural graphite having a high capacity by grinding and/or applying impact to form a negative electrode active material, and a negative electrode active layer formed therefrom is provided on a metal electrode foil. Subsequently, the metal electrode foil is applied with a magnetic field so that the spheroidized natural graphite is oriented, followed by drying and compression molding, thereby forming a negative electrode. By the use of this negative electrode, a nonaqueous electrolyte secondary battery can be formed having superior battery properties such as the cycle properties and peeling strength.

7 Claims, 4 Drawing Sheets

IMAGE OF GRAPHITE GRAIN

PERIMETER l

CHANGE INTO CIRCLE
HAVING THE SAME AREA

PERIMETER L

POWDERED GRAPHITE AND NONAQUEOUS ELECTROLYTE SECONDARY BATTERY

CROSS REFERENCE TO RELATED APPLICATIONS

The present application claims priority to Japanese Patent Application No. 2004-270802 filed in the Japan Patent Office on Sep. 17, 2004, the entire contents of which being incorporated herein by reference.

BACKGROUND

The present invention relates to powdered graphite and a nonaqueous electrolyte secondary battery, and more particularly, relates to powdered graphite used for a negative electrode of a lithium ion secondary battery and a nonaqueous electrolyte secondary battery using the same.

In recent years, concomitant with the advancement of portable information apparatuses such as notebook personal computers and mobile phones, the demand of batteries has been rapidly increasing, and the application thereof also has been expanded. Under these circumstances, besides the trend toward miniaturization and reduction in weight of batteries, the increase in energy density of batteries has been demanded. In addition, from an energy conservation point of view, a high performance secondary battery which can repeatedly perform charge and discharge has also been desired.

As a secondary battery which can satisfy the demands described above, a lithium ion secondary battery has been widely used. Since obtaining a high energy density as compared to a lead secondary battery and a nickel-cadmium secondary battery, which are common aqueous electrolyte secondary batteries, the lithium ion secondary battery has been widely used, and intensive research and development attempting to realize higher performances has been carried out.

As a negative electrode active material used in a lithium ion secondary battery, a carbonaceous material such as non-graphitizable carbon or graphite has been used, and superior cycle properties have been obtained. Natural graphite has a scale shape, and due to its high crystallinity, a capacity close to the theoretical capacity (372 mAh/g) can be realized. Compared to a common capacity of artificial graphite in the range of 330 to 350 mAh/g, the capacity of natural graphite is 360 to 370 mAh/g, and hence a graphite negative electrode is most advantageously formed by filling natural graphite at a high volume density.

Figure 1:
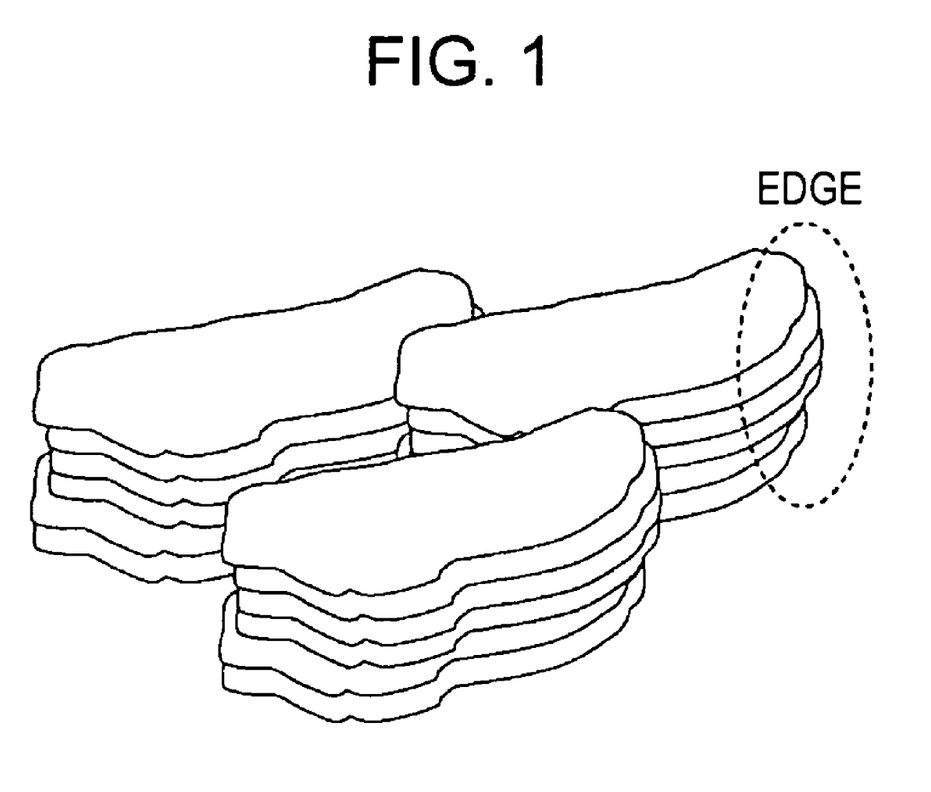
FIG. 1 is a schematic view showing a layered structure of carbon atoms.

When artificial graphite is used, lithium ions are intercalated and deintercalated from various surfaces. On the other hand, as shown in FIG. 1, in natural graphite, carbon atoms form a network structure, and a number of AB planes (layer planes) spreading along the plane direction are laminated to each other to form a bulk shape. A surface formed by the layers thus laminated to each other is called an edge. When natural graphite is used for a negative electrode of a battery, lithium ions are intercalated from the edge in charging and are then diffused between the AB planes. In addition, in discharging, lithium ions are deintercalated and released from the edge.

An electrode used in a lithium ion secondary battery is generally composed of a metal thin film functioning as a collector and at least one active material layer provided on one side or both sides of the above metal thin-film. This active material layer is composed of carbon functioning as an active material, a conducting agent, and a binder binding the above materials to the collector, and the electrode is formed by the steps of applying an active material paste to the metal thin film to form an electrode plate, and drying the electrode plate, followed by appropriate rolling thereof. In this case, scale-shaped graphite having a high capacity tends to be oriented along the longitudinal direction of the electrode. In addition, the above graphite is very soft due to its high crystallinity, and the number of void portions present in the electrode is reduced since the filling properties of the graphite are improved by too much; hence, as a result, when the electrode is formed, an electrolyte may not permeate the electrode in some cases. In the case described above, intercalation/deintercalation reaction of lithium ions in the graphite occurs only at the surface of the electrode, and highly efficient charge and discharge may not be preferably performed.

Figure 2:
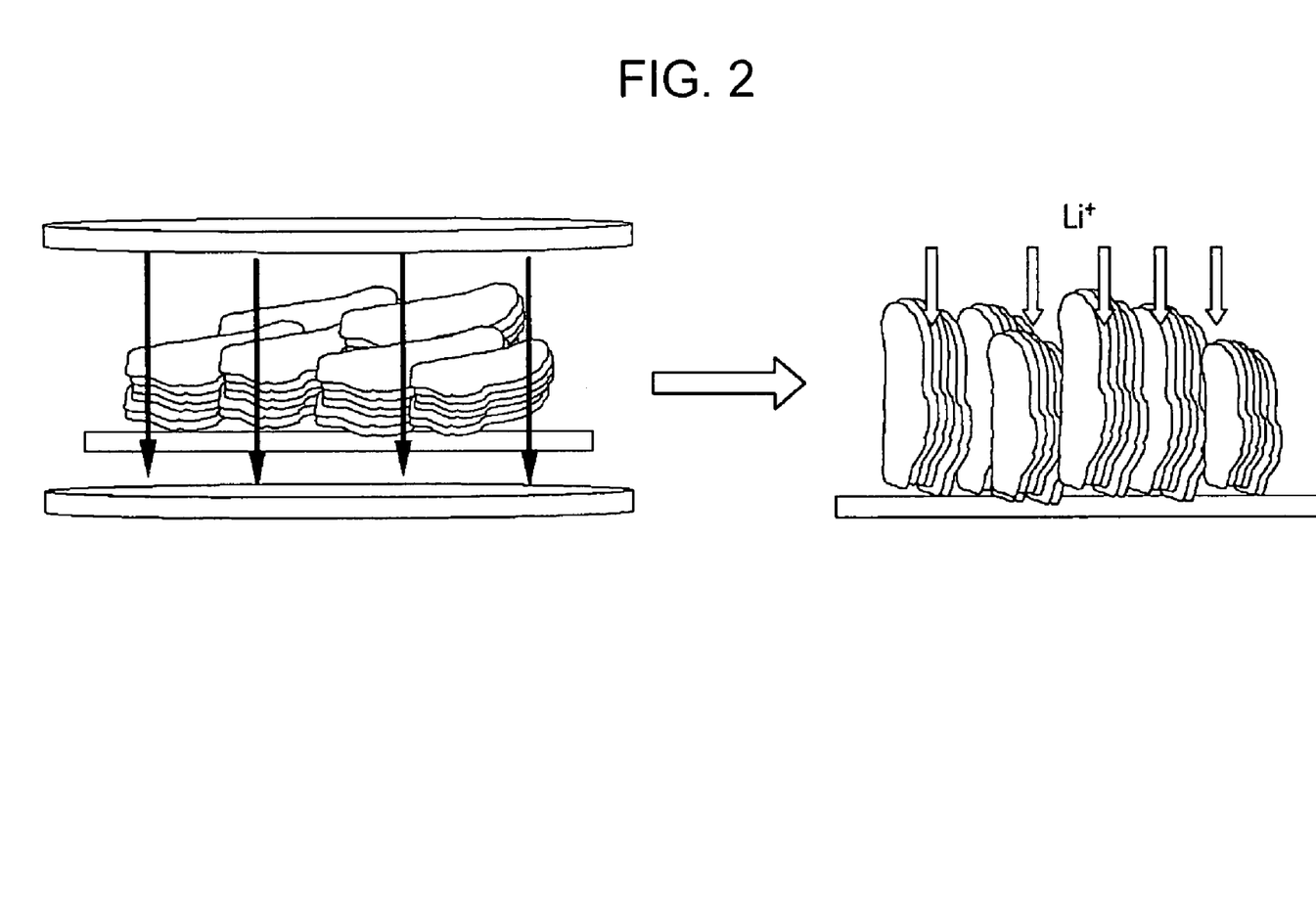
FIG. 2 is a schematic view showing the case in which edges of graphite are oriented in parallel to the surface of an electrode in a magnetic field so that lithium ions are smoothly intercalated between layers of the graphite and deintercalated therefrom.

Accordingly, in Japanese Unexamined Patent Application Publication Nos. 2003-197182 and 2003-197189, a method has been disclosed in which lithium ions are smoothly intercalated between layers of graphite and deintercalated therefrom by disposing the edges parallel to the electrode surface (scale-shaped graphite being disposed perpendicular to the electrode surface) as shown in FIG. 2 using the magnetic field orientation properties of the graphite.

However, when scale-shaped graphite is used for a negative electrode active material of a lithium ion secondary battery, the scale-shaped graphite tends to aggregate, and as a result, a problem may arise in some cases in that a uniformly blended paste is not obtained. The active material paste applied onto the collector for forming the negative electrode preferably has a viscosity of 3 to 12 Pa·s and a solid component content of 40% to 50%. However, in the case of a paste made from scale-shaped graphite, the graphite forms flocks (aggregates) at a solid component content of 40% to 50%, and as a result, application of the paste onto a metal foil may not be performed. In addition, when the solid component content of scale-shaped graphite is 35% or less, the viscosity is rapidly decreased to 1 Pa·s or less. In an electrode formed by applying the paste as described above, the active material layer is very liable to be peeled away, and as a result, the electrode thus prepared may not be easily used in practice.

In addition, when scale-shaped graphite is used without any modification thereof, since the area of the graphite is large, and a large amount of a binder adheres to the graphite, the binding between the active material layer and the metal is weak, and hence the active material layer is liable to be peeled away. Furthermore, when the amount of the binder is increased, the ratio of the active material is decreased, and as a result, the battery properties are degraded.

SUMMARY

The present invention was made in consideration of the above problems, and it is desirable to have a nonaqueous electrolyte secondary battery which has a highly efficient charge and discharge performance and superior cycle properties.

According to an embodiment of the present invention, there is provided powdered graphite produced by a spheroidizing process including the step of grinding natural graphite grains and/or applying impact thereto.

In addition, according to another embodiment of the present invention, there is provided a nonaqueous electrolyte secondary battery including: a positive electrode composed of a positive electrode collector of a belt-shaped metal film and a positive electrode active material provided thereon; a negative electrode composed of a negative electrode collector of a belt-shaped metal film and a negative electrode active material provided thereon; and a separator provided between the positive electrode and the negative electrode. In the non-aqueous electrolyte secondary battery described above, the positive electrode and the negative electrode are spirally wound together with the separator provided therebetween, and the negative electrode active material is primarily composed of graphite powder which is produced a spheroidizing process including the step of grinding natural graphite grains and/or applying impact thereto.

According to an embodiment of the present invention, since the spheroidized graphite grains have rheological properties approximately equivalent to that of spherical grains while retaining the intrinsic orientation properties of natural graphite, the graphite grains are unlikely to aggregate, and hence a uniform paste can be formed. After a paste using the graphite grains as described above is applied to a metal thin-film used as a collector, and edges of the graphite grains are oriented in parallel to the metal thin-film in a magnetic field, followed by drying to removal a solvent, intercalation and deintercalation reaction may smoothly proceed, and as a result, the load characteristics and cycle properties are improved. In addition, by the formation of the electrode as described above, an electrode having a sufficient peeling strength can also be obtained.

Additional features and advantages are described herein, and will be apparent from, the following Detailed Description and the figures.

DETAILED DESCRIPTION

Embodiments of the present invention will be described below. First, a process for spheroidizing scale-shaped natural graphite will be described.

For spheroidizing natural graphite, for example, an apparatus may be used having a continuous path which is bent to the right and to the left many times so that it seems as if a plurality of Z-shaped paths is repeatedly provided. In addition, a method may be used in the above apparatus in which when scale-shaped graphite grains drop in the path of this apparatus, end portions of the graphite grains are bent by collision against the wall of the apparatus so as to spheroidize the graphite grains, and the method described above is called a Z-shaped vertical drop method. The grains thus processed do not necessarily have an ideal spherical shape, and scale-shaped grains are regarded as spheroidized grains when end portions of the grains are bent inside so as to form a spiral shape. Hence, the grains have an irregular spherical shape such as a conical shape or a cylindrical shape. The drop speed of the grains is preferably in the range of approximately 50 to 200 m/sec. In the case of this method, when being supplied and discharged, the graphite is preferably treated together with an air stream.

In addition, by using an impact type pulverizer, a method for spheroidizing graphite may also be performed in which graphite is allowed to collide against the wall of the pulverizer together with an air stream so as to bend scale-shaped end portions of the graphite.

When grains are processed for changing the shape thereof, a method is preferably performed in which after graphite grains are roughly divided into at least two groups based on the size of grains, pulverizing is separately performed for large grains and small grains, and subsequently, the at least two groups of grains are mixed together.

In order to obtain graphite grains used in the embodiment of the present invention, relatively small impact is preferably applied to the graphite, and it may be construed that the degree of spheroidization is approximately proportional to the time spent for this spheroidizing process.

By using the spheroidized graphite material described above, a lithium ion secondary battery is formed.

Figure 3:
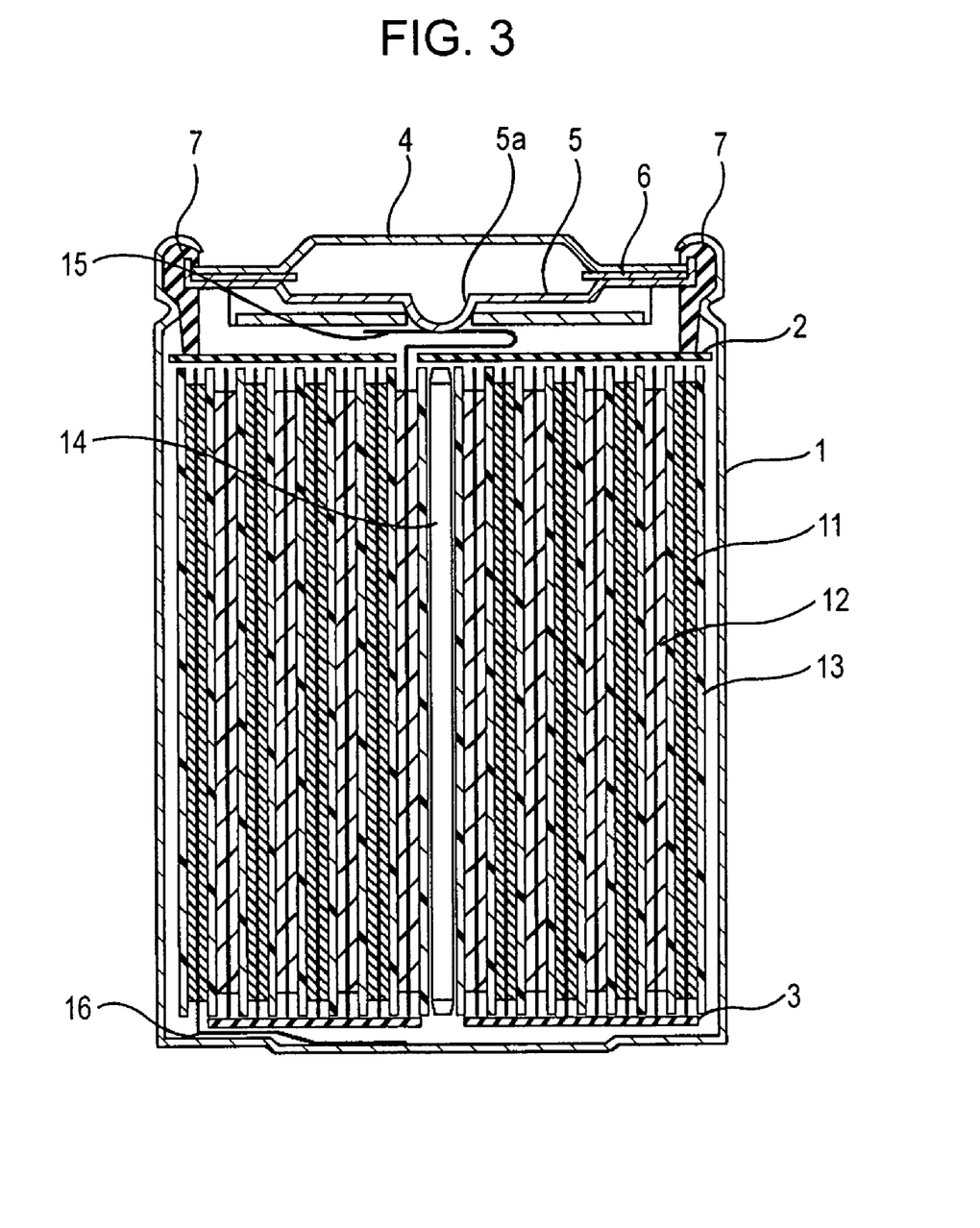
FIG. 3 is a schematic cross-sectional view showing the structure of a lithium ion secondary battery according to an embodiment of the present invention.

FIG. 3 is a cross-sectional view of a lithium ion secondary battery of the embodiment according to the present invention. This secondary battery is a so-called cylindrical type battery, and in a battery case 1 having an approximately hollow cylindrical shape, a spirally wound electrode member is contained which is composed of a belt-shaped positive electrode 11, a belt-shaped negative electrode 12, and a separator 13, the positive electrode 11 and the negative electrode 12 being spirally wound with the separator provided therebetween. The battery case 1 is formed, for example, of a nickel (Ni) plated iron (Fe) plate, and one end of the case 1 is an open end and the other end is a closed end. Inside the battery case 1, a pair of insulating plates 2 and 3 is disposed perpendicular to the circumferential surface of the case 1 so as to sandwich the spirally wound electrode member.

To the open end of the battery case 1, a battery lid 4, a safety valve mechanism 5 and a positive temperature coefficient (hereinafter referred to as "PTC") element 6, both of which are provided inside this battery lid 4, are crimped with an insulation sealing gasket 7 provided therebetween, so that the battery case 1 is sealed. The battery lid 4 is formed, for example, of the same material as that for the battery case 1. The safety valve mechanism 5 is electrically connected to the battery lid 4 via the PTC element 6, and when the internal pressure reaches a certain level or more by internal short circuiting or heating from the outside, a disk plate 5a protrudes to the opposite side, so that the battery lid 4 and the spirally wound electrode member is electrically disconnected. When the temperature is increased, the PTC element 6 suppresses the increase in current by increasing the resistance so as to prevent abnormal heat generation caused by a large amount of current, and the PTC element 6 is formed, for example, of barium titanate-based semiconductor ceramic. For example, the insulation sealing gasket 7 is formed of an insulating material, and the surface thereof is coated with asphalt.

For example, the spirally wound electrode member is formed around a center pin 14 by winding. A positive electrode lead 15 made of aluminum (Al) or the like is connected to the positive electrode 11 of the spirally wound electrode member, and a negative electrode lead 16 made of Ni or the like is connected to the negative electrode 12. Since welded to the safety valve mechanism 5, the positive electrode lead 15 is electrically connected to the battery lid 4, and the negative electrode lead 16 is electrically connected to the battery case 1 by welding.

Hereinafter, the negative electrode, positive electrode, electrolyte, and separator will be described.

Negative Electrode

For example, the negative electrode has the structure in which at least one negative electrode layer is provided on one side or both sides of a negative electrode collector having a pair of surfaces facing each other. The negative electrode collector is formed of a metal foil such as a copper (Cu) foil, a Ni foil, or a stainless steel foil. For example, the thickness of this negative electrode collector is 5 to 50 μm.

A negative electrode reactive layer is formed, for example, of a negative electrode active material, a binder, and a viscosity improver. As the negative electrode active material, the spheroidized scale-shaped natural graphite described above is used.

The binder is added to the spheroidized graphite grains described above, the viscosity improver is then mixed therewith to form a negative electrode mixture, and a paste (slurry) is formed by dispersing the above mixture in water. The slurry thus obtained is then applied to the negative electrode collector. Immediately after this application, the negative electrode collector provided with the slurry of the negative electrode mixture is held still in a magnetic field or is allowed to pass therethrough, so that the graphite grains are oriented in the magnetic field. A magnetic field used for this magnetic field orientation is formed using an electromagnet, a permanent magnet, or the like. The time for holding the negative electrode collector still in the magnetic field or allowing it to pass therethrough may be enough in the range of 0.01 to 30 seconds. In this step, it is preferable that the magnetic lines are uniformly created perpendicular to the surface of the electrode. In addition, immediately after the magnetic field orientation, the electrode is preferably dried.

Positive Electrode

As the positive electrode, a belt-shaped electrode composed of a positive electrode collector and a reactive layer provided thereon is used. The positive electrode collector is formed of a metal foil such as an Al foil, a Ni foil, or a stainless steel foil, and the thickness thereof is approximately 5 to 50 μm.

The positive electrode reactive layer is formed, for example, of a positive electrode active material, a binder such as poly(vinylidene fluoride), and a conducting agent such as carbon black or graphite whenever necessary. As the positive electrode active material, for example, a metal oxide, a metal sulfide, or a specific high molecular weight material may be preferably used, and in accordance with the application of batteries, at least one of the above materials may be selected.

When the carbonaceous material of the embodiment according to the present invention is used as the negative electrode of a lithium ion secondary battery, the positive electrode preferably contains a large amount of Li. As the metal oxide used for the positive electrode active material, for example, a composite metal oxide composed of lithium and a transition metal, such as a compound primarily containing $LiMO_2$, or an intercalation compound containing Li may be preferably used. In the composition described above, M is at least one type of transition metal and, in particular, is preferably at least one element selected from the group consisting of cobalt (Co), nickel (Ni), and manganese (Mn).

As the metal sulfide, for example, $TiS_2$ or $MoS_2$ may be mentioned, and as the high molecular weight material, for example, polyacetylene or polypyrrole may be mentioned. In addition, besides the positive electrode active materials described above, for example, $NbSe_2$ may also be used.

In the lithium ion secondary battery of the embodiment according to the present invention, it is aimed to achieve a high capacity, and hence the amount of Li contained in the above positive electrode preferably at least corresponds to a charge/discharge capacity of 250 mAh or more per one gram of the negative electrode carbonaceous material under the steady state (such as a state after charge and discharge are repeated approximately 5 times). In order to obtain a secondary battery having a higher capacity, the amount of Li contained in the positive electrode preferably corresponds to a charge/discharge capacity of 300 mAh or more and more preferably 330 mAh or more.

In the case described above, Li may not always be supplied from the positive electrode active material, and the amount of Li, which corresponds to a charge/discharge capacity of 250 mAh or more per one gram of the carbonaceous material, may be present in the battery system. In addition, the amount of Li is to be determined by measuring the discharge capacity of the battery.

Electrolyte

When the carbonaceous material of the embodiment according to the present invention is applied to a practical battery, ethylene carbonate (EC) is preferably used as a primary solvent. However, in order to complete the present invention, a plurality of solvent components is preferably further added.

As the solvent used for the electrolyte, an asymmetric chain carbonate such as methyl ethyl carbonate (MEC) or methyl propyl carbonate (MPC) is preferably used. In addition, when a mixture of MEC and dimethyl carbonate (DMC) is used, a superior effect may also be obtained. The volume ratio of EC to a second solvent component is preferably in the range of 7:3 to 3:7. In addition, in a mixed solvent of MEC and DMC, the volume ratio of MEC to DMC is preferably in the range of 2:8 to 9:1.

By addition of the second component, besides the suppression of EC decomposition, various advantages are preferably obtained: improvement in current characteristics due to improvement in conductivity, improvement in low temperature properties due to decrease in freezing point of the electrolyte, and improvement in safety due to decrease in reactivity with a lithium metal.

The nonaqueous electrolyte is prepared by dissolving an electrolyte salt into an organic solvent. As the electrolyte salt, $LiPF_6$ is preferably used; however, any material which is used for this type of battery may also be used. For example, there may be mentioned $LiClO_4$, $LiAsF_6$, $LiBF_4$, $LiB(C_6H_5)_4$, $CH_3SO_3Li$, $CF_3SO_3Li$, $LiCl$, and $LiBr$, and those mentioned above may be used alone or in combination.

Separator

The separator is formed of a porous film of a polyolefin material such as polypropylene or polyethylene or is formed of a porous film of an inorganic material such as a non-woven cloth made of ceramic, and may have the structure containing at least two types of porous films described above.

In general, the thickness of the separator is preferably 10 to 50 μm and more preferably 15 to 40 μm. When the separator is too thick, the amount of the active material is decreased, and on the other hand, when the thickness is too small, the mechanical strength of the film is decreased.

EXAMPLES

By using the spheroidized graphite grains described above as a negative electrode material, a secondary battery is formed. Hereinafter, although the present invention will be described in detail with reference to examples, it is naturally to be understood that the present invention is not limited thereto.

First, a carbonaceous material used in the examples will be described. As the graphite material, natural graphite made in China was prepared. After this graphite was pulverized into powdered scale-shaped graphite as sample 1, sample 1 was further spheroidized by an impact type pulverizer. The spheroidizing process was performed for sample 1 for 2 hours, and the spheroidized graphite thus obtained was named sample 2. In addition, the spheroidizing process was performed for sample 1 for 4 hours, and the spheroidized graphite thus obtained was named sample 3.

Example 1

Using samples 1, 2 and 3, the negative electrodes were formed, and subsequently, coin type test batteries were formed with and without performing magnetic field orientation. Next, the load characteristics of the batteries were measured.

Formation of Coin Type Test Battery

To each of samples 1, 2, and 3, a styrene-butadiene rubber (SBR) was added as a binder so that the content thereof was 2 percent by weight, and carboxymethyl cellulose was then added to the above mixture as a viscosity improver to form a negative electrode mixture. The negative electrode mixture thus formed was then dispersed in water, so that a slurry was obtained. In order to form the electrode, a belt-shaped copper foil having a thickness of 15 μm was used as a collector, and the slurry of the negative electrode mixture was uniformly applied to both sides of this collector. An electrode not to be processed by magnetic field orientation was dried immediately after the above application, followed by compression molding, and an electrode to be processed by magnetic field orientation was held still in a magnetic field of 0.4 T for 30 seconds. In this case, (002) faces of the graphite grains were oriented along the magnetic lines. Subsequently, after the magnetic field was removed, the electrode was allowed to pass through a drying furnace, so that the negative electrode mixture was bonded to the collector while the graphite grains were oriented as described above.

The electrode thus formed was punched out into a pellet having a diameter of 15.5 mm used as a test electrode. The test electrode thus formed was disposed to face a Li metal counter electrode with a porous polypropylene membrane separator provided therebetween, and an electrolyte composed of $LiPF_6$ at a concentration of 1 mole/liter and an equivolume mixed solvent of ethylene carbonate and diethylene carbonate was charged between the electrodes, so that a coin type test battery was formed having a diameter of 20 mm and a thickness of 2.5 mm. When this battery was assembled, operation was performed in a dry air atmosphere at a dew point of −40° C. or less.

The magnetic field strength for magnetic field orientation performed for the graphite grains was approximately 0.4 T, and by this magnetic field strength, the (002) faces of the spheroidized grains could be oriented along the magnetic line direction. In the example of the present invention, since the graphite grains were spheroidized, the rotation of the grains is easily performed in orientation, and the magnetic force required for the rotation can be reduced. In addition, even when the solid component content is the same, the viscosity of the paste obtained from the spheroidized grains is low as compared to that of the paste obtained from scale-shaped graphite, and hence the magnetic field orientation can be easily performed. However, it is preferable that the magnetic lines are uniformly created perpendicular to the surface direction of the electrode.

Measurement of Load Characteristics

By using the coin type test battery having the structure described above, the discharge capacity per one gram of a carbonaceous material was measured. In this case, in a process of doping lithium into a working electrode (charge: strictly saying, the process in which lithium is doped into a carbonaceous material is not charge but is discharge; however, in consideration of a practical battery structure, the doping process and de-doping process are called charge and discharge, respectively, for the sake of convenience), charge at a constant current of 1 mA per cell for 1 hour and a pause for 2 hours were repeatedly performed. The change in potential in the pause was plotted to $\{(time)^{-1/2}\}$, and the charge and pause were performed until an estimated equilibrium potential reached approximately 10 mV ($Li/Li^+$).

As the discharge (de-doping process), discharge at a constant current of 20 mA per cell for 1 hour and a pause for 2 hours were repeatedly performed, and a terminal voltage of 1.5 V was set as a cutoff voltage.

In Table 1 below, the measured values of the discharge capacity per one gram of the carbonaceous material of samples 1, 2, and 3 are shown.

TABLE 1

| | DISCHARGE CAPACITY (mAh/g) | |
| --- | --- | --- |
| | WITH MAGNETIC FIELD | WITHOUT MAGNETIC FIELD |
| SAMPLE 1 | 180 | 138 |
| SAMPLE 2 | 352 | 272 |
| SAMPLE 3 | 240 | 195 |

According to the results of this measurement, sample 2 (spheroidizing time being 2 hours) processed by magnetic field orientation shows the highest discharge capacity. When the results of the samples are compared with each other, sample 2 shows the highest discharge capacity, the capacity of sample 3 (spheroidizing time being 4 hours) is second to that of sample 2, and sample 1 formed using the scale-shaped graphite shows the lowest discharge capacity. In addition, it is understood that in all the samples, the battery in which graphite was processed by magnetic field orientation has a high discharge capacity as compared to that of the battery in which graphite was not processed thereby.

Example 2

Cylindrical type nonaqueous electrolyte secondary batteries having a diameter of 1.8 mm and a height of 65 mm shown in FIG. 3 were formed using samples 1, 2, and 3 as a negative electrode material as described below, and a cycle test was then performed. As a cycle retention rate, the discharge capacity at the initial charge was regarded as 100%, and the discharge capacity (%) obtained after 100 cycles of charge and discharge was measured. By using each of the samples described above, a secondary battery having a negative electrode processed by magnetic field orientation and a secondary battery having a negative electrode not processed by magnetic field orientation were formed, and the cycle retention rates thereof were measured.

Formation of Negative Electrode

To each of samples 1, 2, and 3, a styrene-butadiene rubber (SBR) was added as a binder so that the concentration thereof was 2 percent by weight, and carboxymethyl cellulose was then added to the above mixture as a viscosity improver to form a negative electrode mixture. The negative electrode mixture thus formed was then dispersed in water, so that a slurry was obtained. As the negative electrode collector, a belt-shaped copper foil having a thickness of 10 µm was used, and the slurry of the negative electrode mixture was uniformly applied onto both sides of this collector. A negative electrode not to be processed by magnetic field orientation was dried immediately after the above application, followed by compression molding. A negative electrode to be processed by magnetic field orientation was held still in a magnetic field of 0.4 T for 30 seconds, followed by drying and compression molding, so that a belt-shaped negative electrode was formed.

Formation of Positive Electrode $LiCoO_2$ was obtained by mixing 0.5 moles of lithium carbonate and 1 mole of cobalt carbonate, followed by firing in the air at 900° C. for 5 hours. The material thus formed was measured by x-ray diffraction, and peaks obtained by the measurement well coincided with those of $LiCoO_2$ registered in the JCPDS file. This material was pulverized, and as a result, powdered $LiCoO_2$ having a 50% cumulative grain diameter of 15 µm was obtained. Next, 91 parts by weight of a mixture composed of 95 parts by weight of the powdered $LiCoO_2$ and 5 parts by weight of powdered lithium carbonate, 6 parts by weight of graphite as a conducting agent, and 3 parts by weight of poly(vinylidene fluoride) as a binder were mixed together to form a positive electrode mixture, and this mixture thus formed was dispersed in N-methyl pyrrolidone, thereby forming a slurry.

As the positive electrode collector, a belt-shaped aluminum foil having a thickness of 20 µm was used, and the slurry of the positive electrode mixture was applied onto both sides of this collector and was then dried, followed by compression molding, thereby forming the belt-shaped positive electrode 11.

Formation of Cylindrical Type Nonaqueous Secondary Battery

Next, as shown in FIG. 3, the belt-shaped positive electrode 11, the belt-shaped negative electrode 12, and the separators 13 formed of a porous polypropylene film having a thickness of 25 µm were laminated so as to dispose the negative electrode, the separator, the positive electrode, and the separator in that order and were then spirally wound many times, thereby forming a spirally wound electrode member having an outside diameter of 18 mm.

The spirally wound electrode member thus formed was placed in the nickel plated iron battery case 1. The insulating plates 2 and 3 were provided at the top and the bottom sides of the spirally wound electrode member, the aluminum-made positive electrode lead 15 was extended from the positive electrode 11 and was connected to the battery lid 4, and the nickel-made negative electrode lead 16 was extended from the negative electrode 12 and was then connected to the battery case 1.

Into this battery case 1, an electrolyte composed of 1 mole per liter of $LiPF_6$ in an equivolume mixed solvent of EC and DEC was charged. Next, the battery case 1 was crimped to the safety valve mechanism 5 having a current chopping unit, the PTC element 6, and the battery lid 4 for fixing with the insulation sealing gasket 7 coated with asphalt provided therebetween, thereby maintaining the air-tightness of the battery.

The cycle test was conducted by performing charge at a maximum charge voltage of 4.2 V and a charge current of 1 A for 2.5 hours, followed by discharge at a constant current of 500 mA. Measurement was performed for the cylindrical type nonaqueous electrolyte secondary batteries formed using samples 1, 2, and 3, and the cycle retention rates (%) after 100 cycles are shown in Table 2.

TABLE 2

| | CYCLE RETENTION RATE (%) | |
| --- | --- | --- |
| | WITH MAGNETIC FIELD | WITHOUT MAGNETIC FIELD |
| SAMPLE 1 | 88 | 86 |
| SAMPLE 2 | 95 | 90 |
| SAMPLE 3 | 90 | 88 |

According to the results described above, the cycle properties of the cylindrical type nonaqueous electrolyte secondary battery formed using sample 2 is improved as compared to that of the cylindrical type nonaqueous electrolyte secondary battery formed using sample 1. In addition, the cycle properties of the cylindrical type nonaqueous electrolyte secondary battery formed using sample 3 is also improved as compared to that of the cylindrical type nonaqueous electrolyte secondary battery formed using the sample 1. Hence, it is understood that the spheroidized graphite is suitably used for negative electrode materials of batteries.

In examples 1 and 2, the batteries formed using samples 2 and 3 showed superior properties, and of the two described above, the battery formed using sample 2 showed particularly superior properties. Hence, it is understood that the battery properties can be improved by performing spheroidizing treatment for graphite. However, when graphite is excessively spheroidized as is the case of sample 3, edge portions of graphite are crushed, and intercalation and deintercalation of lithium ions are not easily performed. Hence, the improvement in battery properties is not performed as expected, and the properties may become equivalent to or less than that obtained using scale-shaped graphite in some cases.

Next, in order to confirm whether the results obtained in examples 1 and 2 were caused by the spheroidization effect or not, the properties of samples 1, 2, and 3 were measured.

Example 3

The specific surface areas of samples 2 and 3 were measured and were then compared with that of sample 1 composed of the scale-shaped graphite, so that the state of spheroidization was measure. The specific surface area was measured by a BET method. An adsorbing material in measurement was nitrogen, and the deaeration temperature and time were set to 120° C. and 30 minutes, respectively.

In Table 3 below, the values of the specific surface areas of samples 1, 2, and 3 measured by a BET method are shown.

TABLE 3

| | SPECIFIC SURFACE AREA ($m^2$/g) |
| --- | --- |
| SAMPLE 1 | 4.83 |
| SAMPLE 2 | 4.30 |
| SAMPLE 3 | 3.60 |

From the results shown above, it is understood that as the time for pulverization using an impact type pulverizer is increased, the specific surface area is decreased, and hence, it is understood that the natural graphite grains are reliably spheroidized.

Example 4

Next, the degree of spheroidization of the graphite was measured. For this measurement, a flow type grain image analyzer manufactured by SYSMEX Corp. under the trade name EPIA2100 was used, and measurement was performed by the following method.

Figure 4:
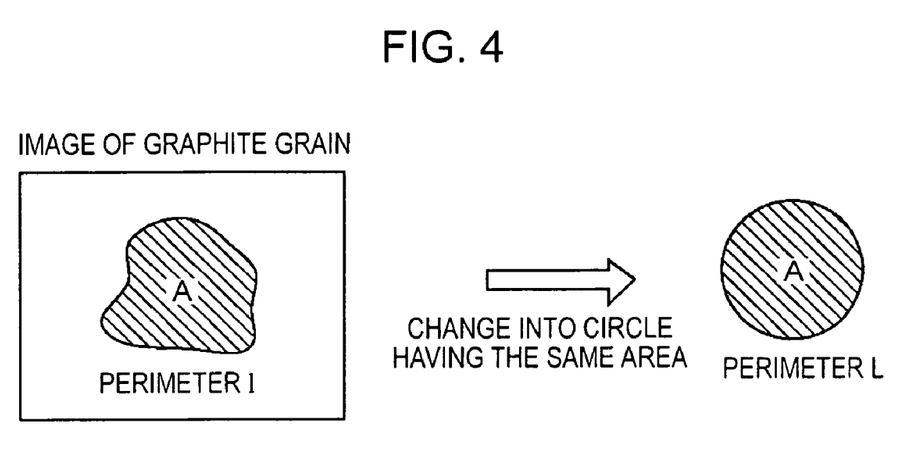
FIG. 4 is a schematic diagram illustrating a method for measuring the circularity using image analysis in which the degree of spheroidization of each graphite grain is obtained by changing the image of each natural graphite grain into a circle having the same area as that of the image.

After the graphite grains of samples 2 and 3, which were processed by spheroidizing treatment using an impact type pulverizer, and the graphite grains of sample 1 were placed in respective beakers, 50 ml of purified water and a dispersing agent NP-10 were added thereto, followed by ultrasonic treatment at 300 W for 3 seconds, thereby obtaining samples. The measurement was then started by evacuation. By the flow type grain image analyzer, images of the respective graphite grains were obtained. By analysis of the images described above, the degrees of spheroidization of the respective graphite grains were measured. As shown in FIG. 4, the perimeter of a circle having the same area as that of the image of each natural graphite grain obtained by image analysis was represented by L, the actual perimeter was represented by I, and L/I was defined as the circularity.

In Table 4 below, the circularity and the analytical ratio of the number of grains having a circularity of 0.85 or less are shown.

TABLE 4

| | CIRCULARITY | RATIO OF GRAINS HAVING CIRCULARITY OF 0.85 OR LESS |
|---|---|---|
| SAMPLE 1 | 0.895 | 22.9% |
| SAMPLE 2 | 0.936 | 8.7% |
| SAMPLE 3 | 0.942 | 6.0% |

According to the results described above, compared to sample 1, sample 2 has a small ratio of grains having a circularity of 0.85 or less and has a high circularity. In addition, as is the case described above, compare to sample 2, sample 3 has a small ratio of grains having a circularity of 0.85 or less and has a high circularity. Hence, it is understood that as the spheroidizing time is increased, the degree of spheroidization becomes higher.

Example 5

Next, in order to investigate the relationship between the spheroidization and the peeling strength, the peeling strengths of the electrodes formed using samples 1, 2, and 3 were measured. The paste of the negative electrode mixture was applied onto a metal electrode foil and was then held still in a magnetic field of 0.4 T for 30 seconds, so that the graphite was processed by magnetic field orientation. The electrode thus obtained was used for measurement.

For a peeling strength test, an apparatus was used manufactured by Shimadzu Corporation under the trade name Shimadzu Autograph AG-LS of MS model series. The electrode described above was cut into a test piece having a length of 150 mm and a width of 32 mm. After approximately a half of the copper foil was peeled away from the electrode and was then held by an upper chuck, and the electrode provided with the copper foil was held by a lower chuck, the peeling strength was then measured.

In Table 5 below, the peeling strengths of the electrodes formed using samples 1, 2, and 3 are shown. The mixed viscosities of sample 1, sample 2, and sample 3 were set to 0.5 Pa·s, 7 Pa·s, and 7 Pa·s, respectively. The solid component content is preferably in the range of 50% to 40% for application. However, in the paste using sample 1, when the solid component content was in the range of 50% to 40%, flocks were formed (aggregates), and application was not performed; hence, the solid component content was decreased to 35%, and the electrode was then formed.

TABLE 5

| | PEELING STRENGTH (mN/mm) |
|---|---|
| SAMPLE 1 | 2.6 |
| SAMPLE 2 | 10 |
| SAMPLE 3 | 11 |

According to the results of example 5, it is understood that by spheroidizing natural graphite grains, the peeling strength is increased. The reason for this is that since shape irregularities of the graphite grains are reduced by spheroidization, a stable slurry can be formed even when the solid component content is high. Since application of a slurry having a high solid component content can be performed, the peeling strength is improved.

Example 6

Furthermore, in order to investigate the effect of magnetic field orientation, X-ray diffraction measurement was performed for the electrode after compression molding. In Table 6 below, the strength ratio {(110) face/(002) face} is shown which were obtained with and without performing magnetic field orientation.

TABLE 6

| | I(110)/I(002) | |
|---|---|---|
| | WITH MAGNETIC FIELD | WITHOUT MAGNETIC FIELD |
| SAMPLE 1 | 5.40 | 0.490 |
| SAMPLE 2 | 0.10 | 0.016 |
| SAMPLE 3 | 0.07 | 0.014 |

It was confirmed that as the spheroidization proceeds, the strength ratio {(110) face/(002) face} is decreased, and the anisotropy is reduced. In addition, it was also confirmed that the strength ratio {(110) face/(002) face} of the spheroidized graphite is even increased by magnetic field orientation. Accordingly, it is understood that even in the spheroidized graphite grains, the edges thereof are disposed in parallel to the surface of the electrode.

As described above, when appropriate spheroidizing treatment is performed for natural graphite having a high capacity, and the graphite thus processed is used as a negative electrode for forming a secondary battery, the battery properties, such as the cycle properties and the peeling strength, can be improved.

Although the embodiment of the present invention has thus been described in detail, the present invention is not limited thereto and may be modified and changed without departing from the spirit and the scope of the present invention.

For example, the values described in the above embodiment are shown by way of example, and whenever necessary, different values may also be used.

In addition, the spheroidization of natural graphite may be performed by grinding instead of applying impact.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A nonaqueous electrolyte secondary battery comprising:
a positive electrode including a positive electrode collector composed of a belt-shaped metal foil and a positive electrode active material layer provided thereon;
a negative electrode including a negative electrode collector composed of a belt-shaped metal foil and a negative electrode active material layer provided thereon; and
a separator, wherein the positive electrode and the negative electrode are provided with the separator therebetween being spirally wound, and
wherein the negative electrode active material layer comprises a graphite powder obtained by spheroidizing natural graphite grains including dividing the graphite grains into at least two groups based on size, pulverizing each group separately, and subsequently mixing the groups wherein the graphite grains are bent during processing so as to spheroidize the graphite grains, a binder, and a viscosity improver,
wherein the negative electrode collector provided with the negative electrode active material layer thereon is applied with a magnetic field so that edges of the graphite grains are oriented in a same direction, followed by drying to remove a solvent and compression molding,
wherein when a perimeter of a circle having an area equivalent to that of an image of one of the spheroidized natural graphite grains is represented by L, an actual perimeter of an image of said one of the spheroidized natural graphite grains is represented by I, and the ratio L/I is defined as a circularity, a number of grains having a circularity of 0.85 or less is 20% or less of a total number of the grains, and
wherein the spheroidized natural graphite grains have a strength ratio represented by {(110) face/(002) face} that ranges from 0.07 to 0.1 and wherein the strength ratio is measured by an X-ray diffraction method, and wherein the average circularity is 0.936 or more.

2. The nonaqueous electrolyte secondary battery according to claim 1,
wherein the negative electrode is composed of the negative electrode collector and the negative electrode active material layer provided on one surface thereof and is processed by magnetic field orientation, and wherein the negative electrode has a peeling strength that ranges from 3 to 15 mN/mm.

3. The nonaqueous electrolyte secondary battery according to claim 1, wherein the spheroidized natural graphite grains have a specific surface area that ranges from 3 m²/g to 5 m²/g, and wherein the specific surface area is measured by a BET method.

4. The nonaqueous electrolyte secondary battery according to claim 1, wherein the graphite powder is obtained by at least one or grinding the natural grain particles and applying impact thereto.

5. A nonaqueous electrolyte secondary battery comprising:
a positive electrode including a positive electrode collector composed of a belt-shaped metal foil and a positive electrode active material layer provided thereon;
a negative electrode including a negative electrode collector composed of a belt-shared metal foil and a negative electrode active material layer provided thereon; and
a separator wherein the positive electrode and the negative electrode are provided with the separator therebetween being spirally wound, and
wherein the negative electrode active material layer comprises a graphite powder obtained by spheroidizing natural graphite grains including dividing the graphite grains into at least two groups based on size, pulverizing each group separately, and subsequently mixing the groups wherein the graphite grains are bent during processing so as to spheroidize the graphite grains, a binder, and a viscosity improver,
wherein the negative electrode collector provided with the negative electrode active material layer thereon is applied with a magnetic field so that edges of the graphite gains are oriented in a same direction, followed by drying to remove a solvent and compression molding,
wherein when a perimeter of a circle having an area equivalent to that of an image of one of the spheroidized natural graphite grains is represented by L, an actual perimeter of an image of said one of the spheroidized natural graphite grains is represented by I, and the ratio L/I is defined as a circularity, a number of grains having a circularity of 0.85 or less is 20% or less of a total number of the grains, and
wherein the spheroidized natural graphite grains have a strength ratio represented by {(110) face/(002) face} that ranges from 0.07 to 0.1 and wherein the strength ratio is measured by an X-ray diffraction method, wherein the average circularity is 0.942 or more.

6. A nonaqueous electrolyte secondary battery comprising:
a positive electrode including a positive electrode collector composed of a belt-shaped metal foil and a positive electrode active material layer provided thereon;
a negative electrode including a negative electrode collector composed of a belt-shaped metal foil and a negative electrode active material layer provided thereon; and
a separator, wherein the positive electrode and the negative electrode are provided with the separator therebetween being spirally wound, and
wherein the negative electrode active material layer comprises a graphite powder obtained by spheroidizing natural graphite grains including dividing the graphite grains into at least two groups based on size, pulverizing each group separately, and subsequently mixing the groups wherein the graphite grains are bent during processing so as to spheroidize the graphite grains, a binder, and a viscosity improver,
wherein the negative electrode collector provided with the negative electrode active material layer thereon is applied with a magnetic field so that edges of the graphite grains are oriented in a same direction, followed by drying to remove a solvent and compression molding,
wherein when a perimeter of a circle having an area equivalent to that of an image of one of the spheroidized natural graphite grains is represented by L, an actual perimeter of an image of said one of the spheroidized natural graphite grains is represented by I, and the ratio L/I is defined as a circularity, a number of grains having a circularity of 0.85 or less is 20% or less of a total number of the grains, and
wherein the spheroidized natural graphite grains have a strength ratio represented by {(110) face/(002) face} that ranges from 0.07 to 0.1 and wherein the strength ratio is measured by an X-ray diffraction method, wherein the number of grains having a circularity of 0.85 or less is about 8.7% or less of a total number of the grains.

7. A nonaqueous electrolyte secondary battery comprising:
a positive electrode including a positive electrode collector composed of a belt-shaped metal foil and a positive electrode active material layer provided thereon;
a negative electrode including a negative electrode collector composed of a belt-shaped metal foil and a negative electrode active material layer provided thereon; and
a separator, wherein the positive electrode and the negative electrode are provided with the separator therebetween being spirally wound, and
wherein the negative electrode active material layer comprises a graphite powder obtained by spheroidizing natural graphite grains including dividing the graphite grains into at least two groups based on size, pulverizing each group separately, and subsequently mixing the groups wherein the graphite grains are bent during processing so as to spheroidize the graphite grains, a binder, and a viscosity improver,
wherein the negative electrode collector provided with the negative electrode active material layer thereon is applied with a magnetic field so that edges of the graphite grains are oriented in a same direction, followed by drying to remove a solvent and compression molding,
wherein when a perimeter of a circle having an area equivalent to that of an image of one of the spheroidized natural graphite grains is represented by L, an actual perimeter of an image of said one of the spheroidized natural graphite grains is represented by I, and the ratio L/I is defined as a circularity, a number of grains having a circularity of 0.85 or less is 20% or less of a total number of the grains, and
wherein the spheroidized natural graphite grains have a strength ratio represented by {(110) face/(002) face} that ranges from 0.07 to 0.1 and wherein the strength ratio is measured by an X-ray diffraction method, wherein the number of grains having a circularity of 0.85 or less is about 6.0% or less of a total number of the grains.

* * * * *